(12) United States Patent
Huang (10) Patent No.: US 8,282,052 B2
(45) Date of Patent: Oct. 9, 2012

(54) SCREEN SUPPORTING APPARATUS

(76) Inventor: Ming-Hsien Huang, Taipei Hsien (TW)

(*) Notice: Subject to any disclaimer, the term of this patent is extended or adjusted under 35 U.S.C. 154(b) by 0 days.

(21) Appl. No.: 12/985,505

(22) Filed: Jan. 6, 2011

(65) Prior Publication Data

US 2012/0056050 A1 Mar. 8, 2012

(30) Foreign Application Priority Data

Sep. 3, 2010 (TW) ................................ 99217142 U (51) Int. Cl.
*A47F 5/00* (2006.01)

(52) U.S. Cl. ............... 248/125.1; 248/284.1; 248/286.1; 248/919; 248/923

(58) Field of Classification Search ............... 248/274.1, 248/917, 919, 920, 923, 371, 397, 284.1, 248/286.1, 292.14, 125.1, 183.1, 183.2, 221.11; 361/679.02, 679.22, 679.58
See application file for complete search history.

(56) References Cited

U.S. PATENT DOCUMENTS

| | | | | | |
|---|---|---|---|---|---|
| 5,904,328 | A | * | 5/1999 | Leveridge et al. | 248/124.1 |
| 6,061,104 | A | * | 5/2000 | Evanicky et al. | 248/274.1 |
| 6,554,238 | B1 | * | 4/2003 | Hibberd | 248/278.1 |
| 7,152,836 | B2 | * | 12/2006 | Pfister et al. | 248/292.14 |
| 7,487,944 | B2 | * | 2/2009 | Tisbo et al. | 248/288.51 |
| 7,529,083 | B2 | * | 5/2009 | Jeong | 361/679.04 |
| 7,559,520 | B2 | * | 7/2009 | Quijano et al. | 248/309.1 |
| 7,857,270 | B2 | * | 12/2010 | Short et al. | 248/284.1 |
| 7,995,332 | B2 | * | 8/2011 | Ozolins et al. | 361/679.06 |
| 8,000,090 | B2 | * | 8/2011 | Moscovitch | 361/679.04 |
| 2003/0015632 | A1 | * | 1/2003 | Dunn et al. | 248/122.1 |

* cited by examiner

*Primary Examiner* — Terrell McKinnon
*Assistant Examiner* — Monica Millner
(74) *Attorney, Agent, or Firm* — Frommer Lawrence & Haug LLP; Ronald R. Santucci (57) ABSTRACT

A screen supporting apparatus includes a supporting member and a movable assembly. The supporting member includes a base and an upright supporting rod disposed fixedly on and above the base. The movable assembly includes a mounting member disposed on the supporting rod and including a slideway unit. The sliding member has two spaced-apart engaging portions slidable within the slideway unit of the mounting member to adjust the inclination angle of the sliding member relative to the mounting member.

16 Claims, 13 Drawing Sheets

SCREEN SUPPORTING APPARATUS

CROSS-REFERENCE TO RELATED APPLICATION

This application claims priority of Taiwanese Patent Application No. 099217142, filed on Sep. 3, 2010, the disclosure of which is incorporated herein by reference.

BACKGROUND OF THE INVENTION

1. Field of the Invention

This invention relates to a screen supporting apparatus, and more particularly to a screen supporting apparatus operable for adjusting the inclination angle of a screen to be supported.

2. Description of the Related Art

Taiwanese Utility Model Patent Number M336654 discloses a conventional screen supporting apparatus, which includes an upright supporting rod, a movable member sleeved movably on the supporting rod, and first and second supporting arms connected respectively and pivotally to two opposite sides of the movable member for supporting two screens, respectively.

The aforesaid conventional screen supporting apparatus has a disadvantage. That is, the inclination angle of each of the screens cannot be adjusted, thereby resulting in inconvenience during use of the conventional screen supporting apparatus.

SUMMARY OF THE INVENTION

The object of this invention is to provide a screen supporting apparatus that can be operated to adjust the inclination angle of a screen to be supported.

Accordingly, a screen supporting apparatus of this invention includes a supporting member and a movable assembly. The supporting member includes a base and an upright supporting rod disposed fixedly on and above the base. The movable assembly includes a mounting member disposed on the supporting rod and including a slideway unit. The sliding member has two spaced-apart engaging portions slidable within the slideway unit of the mounting member to adjust the inclination angle of the sliding member relative to the mounting member.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Referring to FIGS. 1, 2, 3, and 4, the first preferred embodiment of a screen supporting apparatus according to this invention includes a supporting member 1, a movable assembly 2, two side arms 3, two movable connectors 4, and a wire collector 5.

Figure 7:
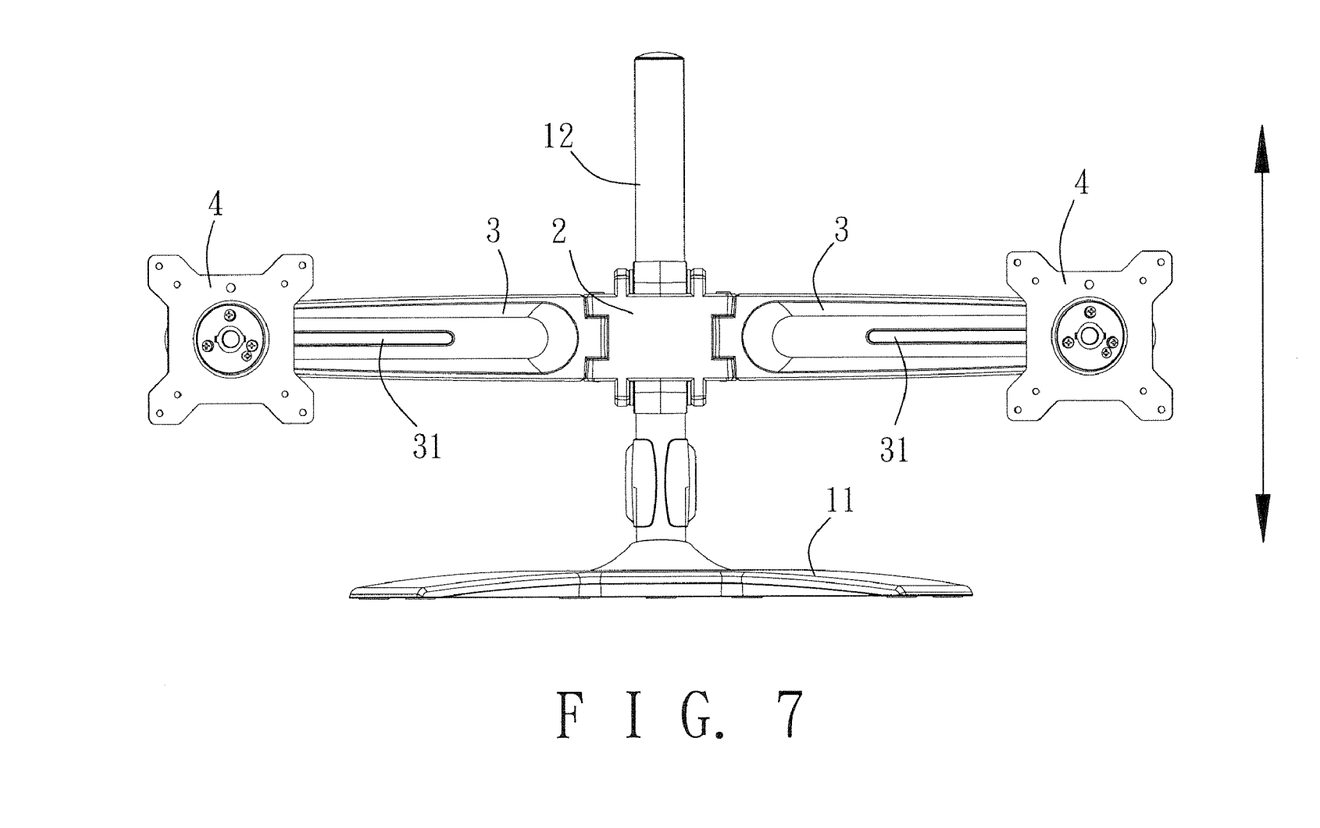
FIG. 7 is a front view of the first preferred embodiment, illustrating vertical movement of a movable assembly.

The supporting member 1 includes a base 11 and an upright supporting rod 12 disposed fixedly on and above the base 11. The movable assembly 2 includes a mounting member 21 disposed on the supporting rod 11, and a sliding member 22 disposed on the mounting member 21 in such a manner that the inclination angle of the sliding member 22 relative to the mounting member 21 is adjustable. The mounting member 21 includes a slideway unit. In this embodiment, the supporting rod 12 is vertical, and the slideway unit includes a pair of curved upper and lower slideways 211 each having an upper end 2111 and a lower end 2112 disposed below the upper end 2111. Alternatively, the lower end 2112 of the upper slideway 211 may be in spatial communication with the upper end 2111 of the lower slideway 211. If this occurs, the slideway unit includes only one C-shaped slideway. The movable assembly 2 further includes a C-shaped sleeve portion 212 sleeved movably on the supporting rod 12, a first locking element 215 for locking the sleeve portion 212 releaseably on the supporting rod 12, and a slot-defining portion 213 connected fixedly to the sleeve portion 212 and formed with the upper and lower slideways 211. The first locking element 215 is configured as a lock bolt, and can be loosened to allow for vertical movement of the sleeve portion 212 on the supporting rod 12, as shown in FIG. 7. The upper and lower slideways 211 are configured respectively as two slide slots. The slot-defining portion 213 includes a curved upper hollow body 214 extending forwardly and upwardly from the sleeve portion 212, and a curved lower hollow body 214' disposed under the upper hollow body 214 and extending forwardly and downwardly from the sleeve portion 212. Each of the slide slots 211 is formed through a corresponding one of the upper and lower hollow bodies 214, 214', and extends along the length of the corresponding one of the upper and lower hollow bodies 214, 214'. The sliding member 22 has a main body 221. The main body 221 has upper and lower sides 2211, and two lateral sides 2212 opposite to each other in a left-to-right direction. The sliding member 22 further has two spaced-apart engaging portions 222 slidable within the slideway unit of the mounting member 21 to adjust the inclination angle of the sliding member 22 relative to the mounting member 21. Each of the engaging portions 222 is configured as a sliding rod that is connected between two mounting portions 225 and that includes a bolt 223 extending along a corresponding one of the upper and lower sides 2211 and through a corresponding one of the upper and lower slideways 214, 214' to engage threadably one of the mounting portions 225, and two stepped washers 224 sleeved on the bolt 223 and extending respectively and partially into the corresponding one of the upper and lower slideways 214, 214'. As such, the sliding rods 222 can be locked respectively and releaseably on the upper and lower hollow bodies 214, 214'.

The two side arms 3 are connected respectively and pivotally to the lateral sides 2212 of the sliding member 22, and extend from the sliding member 22 away from each other. Each of the side arms 3 includes an arm body 30, a horizontal guide slot 31 formed through the arm body 30 and extending along a longitudinal direction of the arm body 30, a vertical pivot shaft 32 connected fixedly to an end of the arm body 30 and connected pivotally to the sliding member 22 so as to allow for horizontal rotation of the corresponding side arm 3 (see FIGS. 8 and 9) and co-movement of the corresponding side arm 3 with the sliding member 22, and a position-limiting rib 33 extending from the pivot shaft 32 toward the sliding member 22. The main body 221 of the sliding member 22 further has two position-limiting grooves 226. The position-limiting ribs 33 of the side arms 3 are rotatable respectively within the position-limiting grooves 226 for limiting the rotational angle range of the side arms 3 relative to the sliding member 22.

Figure 10:
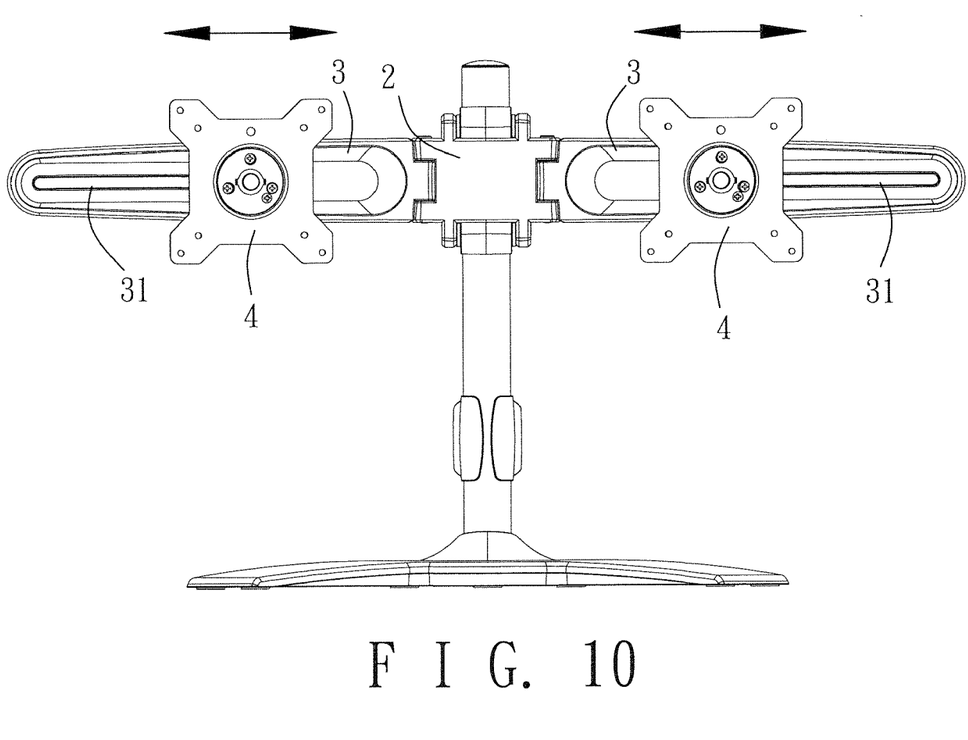
FIG. 10 is another front view of the first preferred embodiment, illustrating movement of the two movable connectors relative to the side arms.

The two movable connectors 4 are disposed respectively and movably on the side arms 3. Each of the movable connectors 4 is movable within the guide slot 31 in the corresponding side arm 3 along a longitudinal direction of the corresponding side arm 3. In this embodiment, each of the movable connectors 4 includes a supporting plate 41 adapted for mounting a screen (not shown) thereon and in front thereof, a second locking element 42 configured as a lock bolt for locking the corresponding movable connector 4 releaseably on the corresponding side arm 3, and an insert element 43 connected fixedly to a rear side of the supporting plate 41 and formed with a sliding block 431 movable within the corresponding guide slot 31. Each of the sliding blocks 431 of the movable connectors 4 is rectangular, and has a vertical width that is slightly smaller than that of the corresponding guide slot 31, so as to allow for smooth movement of the corresponding sliding block 431 within the corresponding guide slot 31, as shown in FIG. 10. The wire collector 5 is disposed on the supporting rod 12 for permitting extension of wires connected to the screens.

Figure 1:
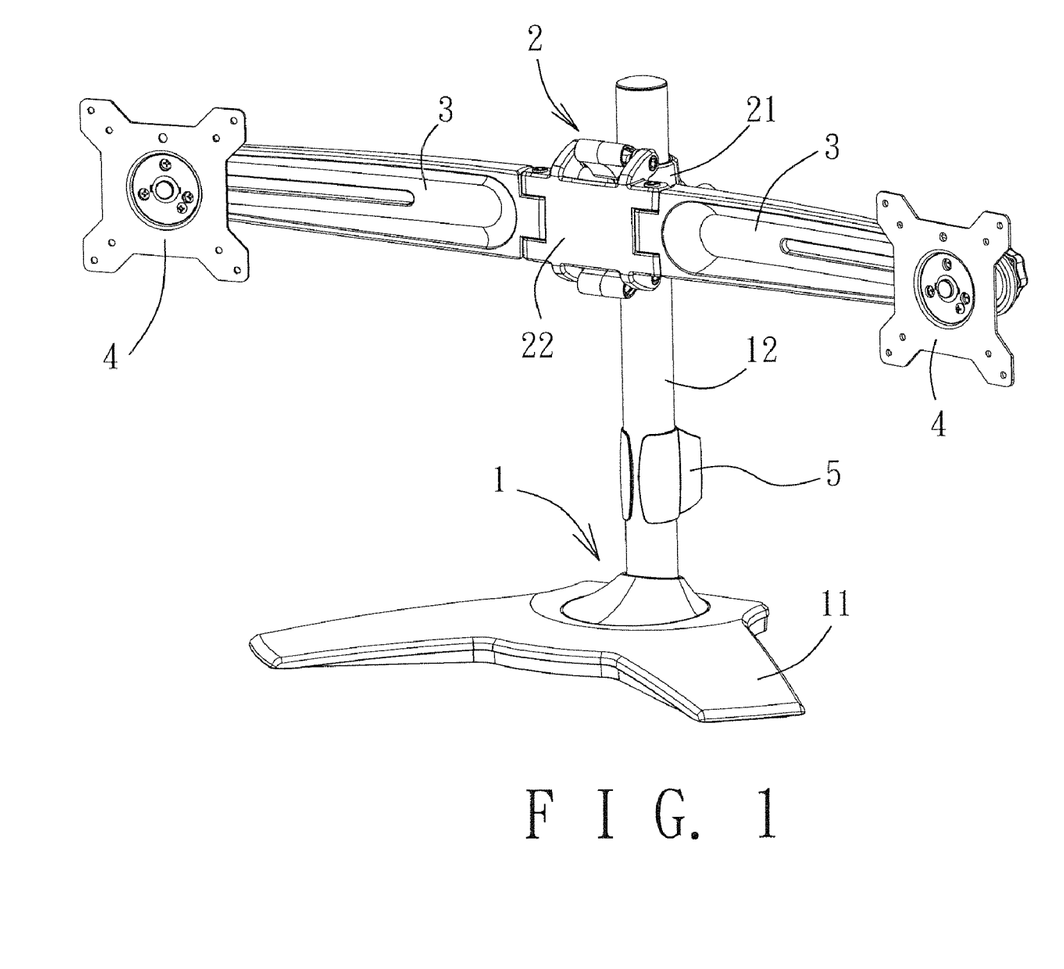
FIG. 1 is a front perspective view of the first preferred embodiment of a screen supporting apparatus according to this invention.
Figure 2:
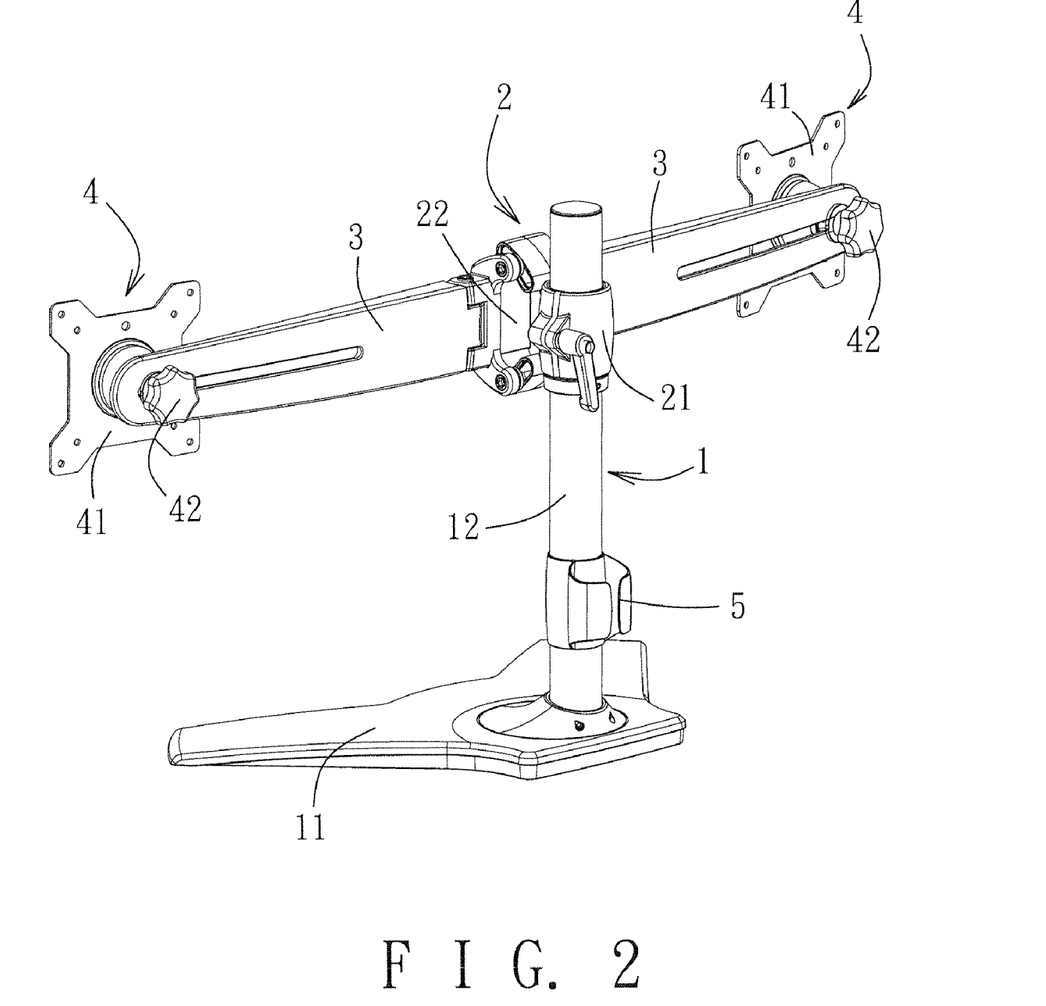
FIG. 2 is a rear perspective view of the first preferred embodiment.
Figure 3:
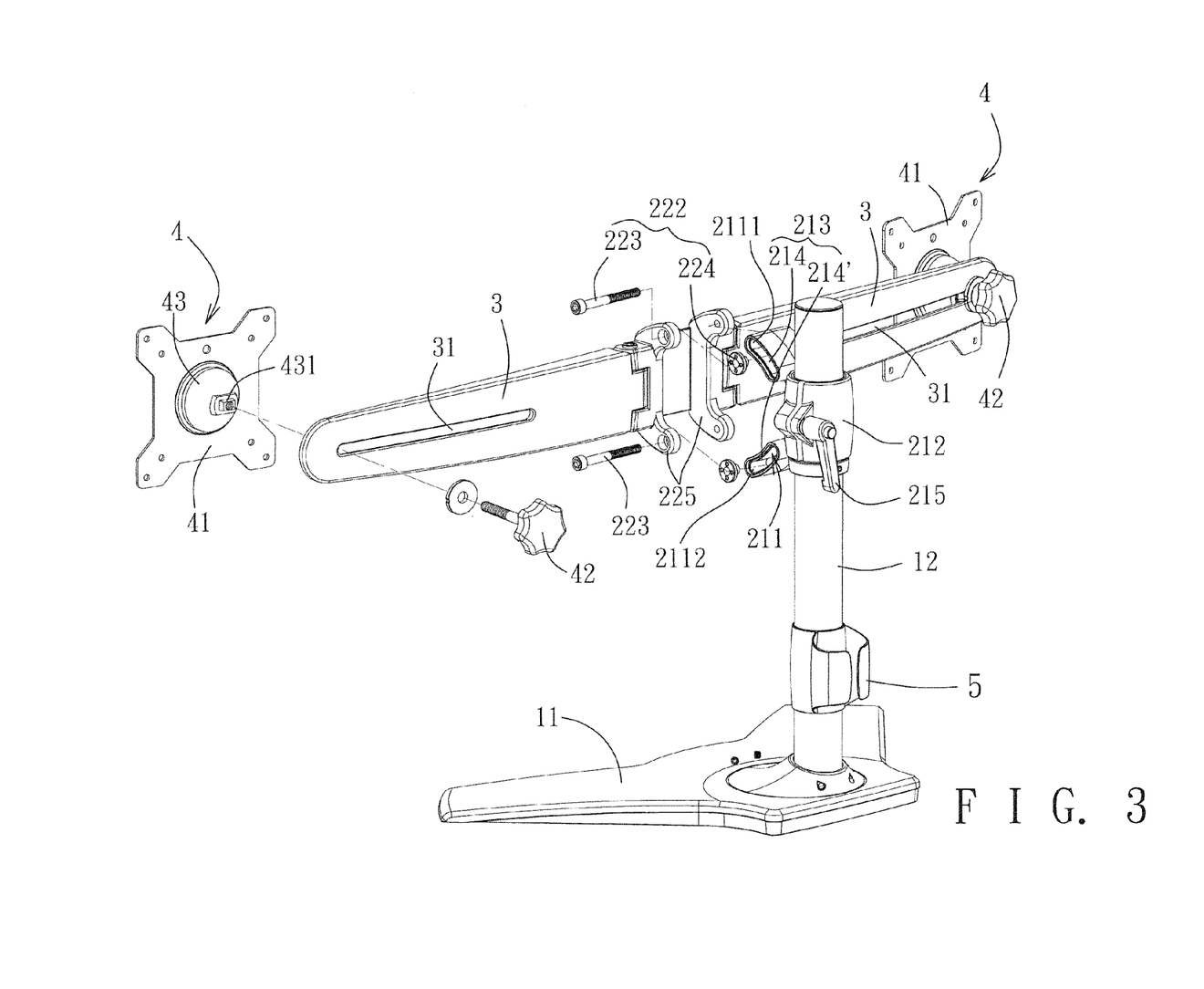
FIG. 3 is a partly exploded rear perspective view of the first preferred embodiment, illustrating a connection between a mounting member and a sliding member.
Figure 4:
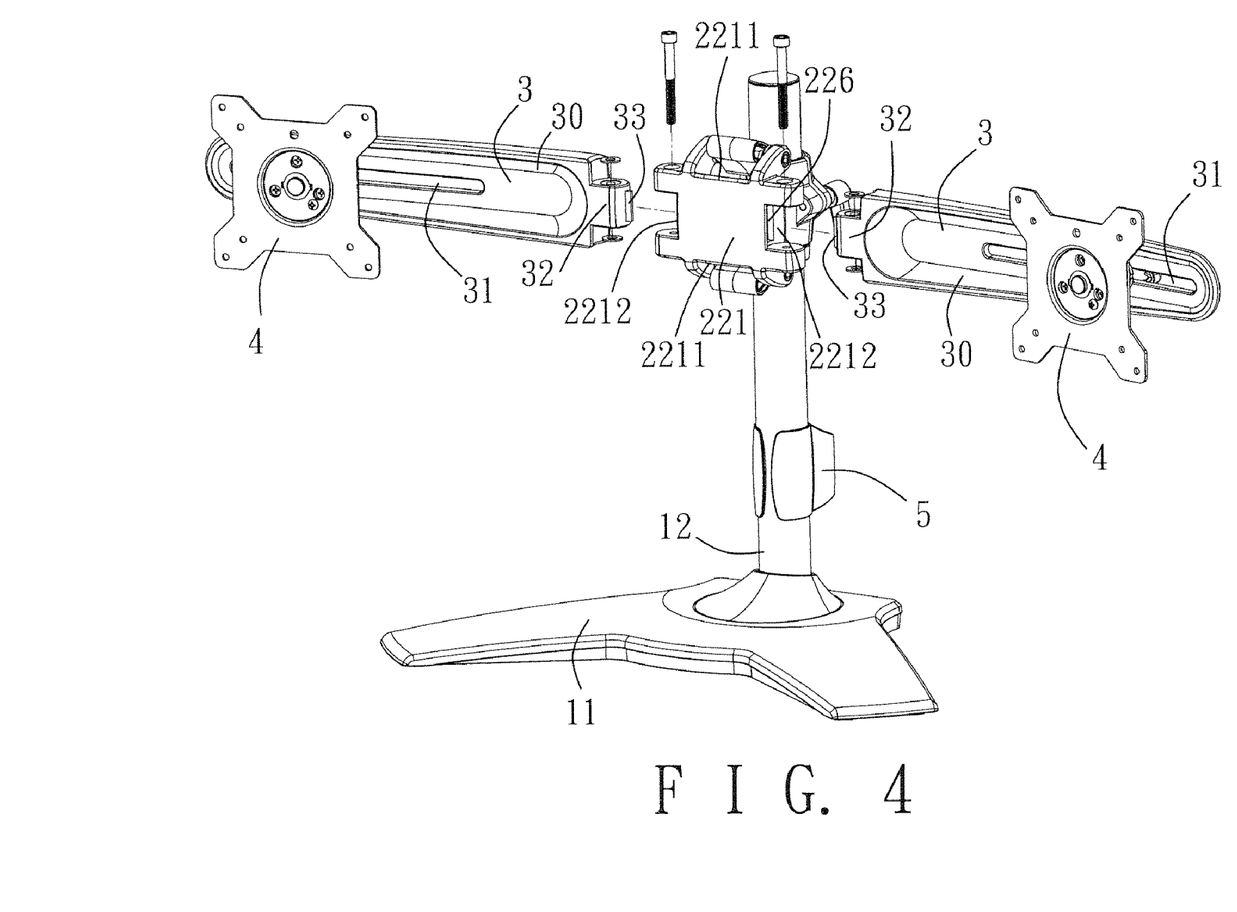
FIG. 4 is a partly exploded front perspective view of the first preferred embodiment, illustrating a connection between the sliding member and two side arms.
Figure 5:
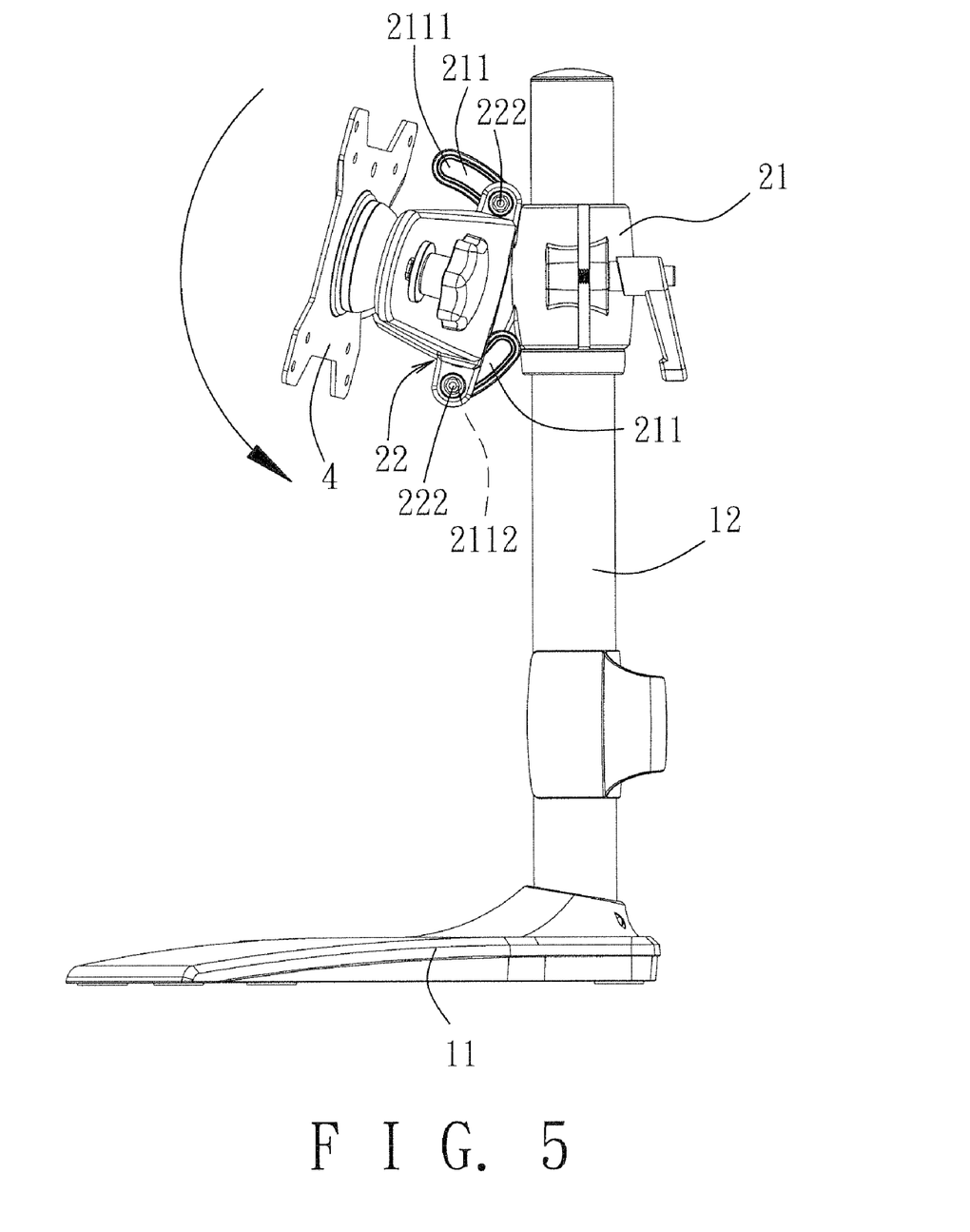
FIGS. 5 and 6 are schematic side views of the first preferred embodiment, illustrating how two sliding rods are moved respectively within two slide slots for adjusting the inclination angle of a movable connector.
Figure 6:
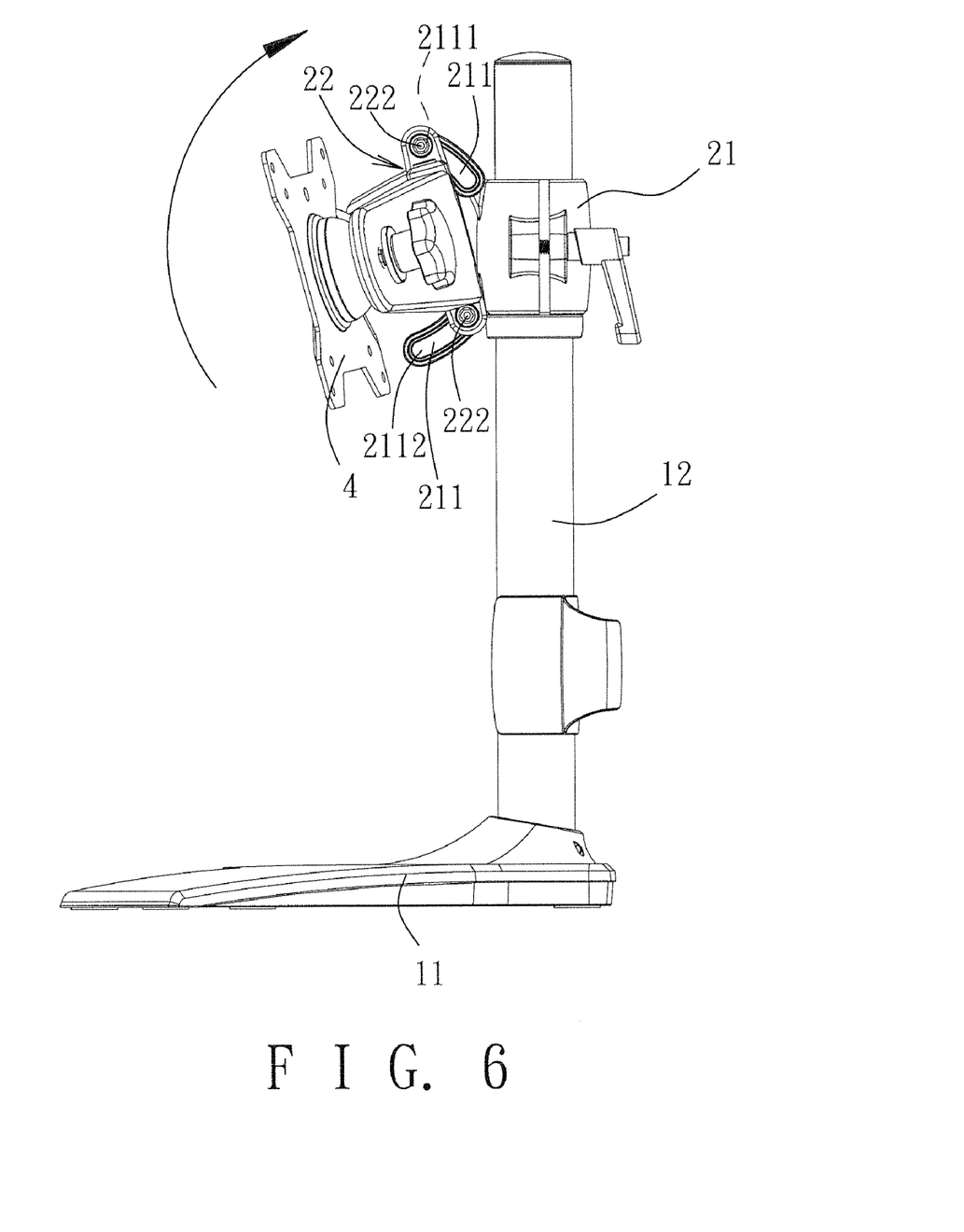
Figure 8:
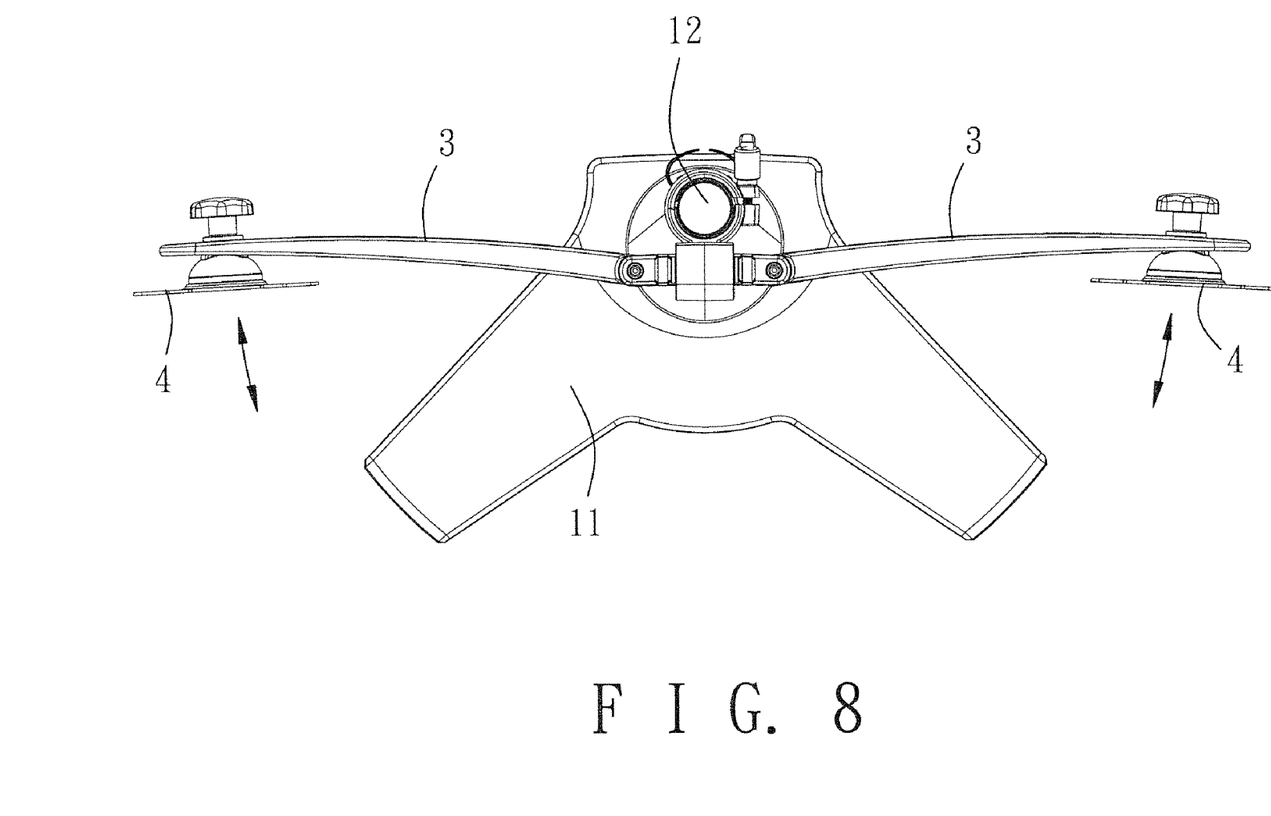
FIGS. 8 and 9 are top views of the first preferred embodiment, illustrating pivoting movement of two side arms relative to the sliding member.
Figure 9:
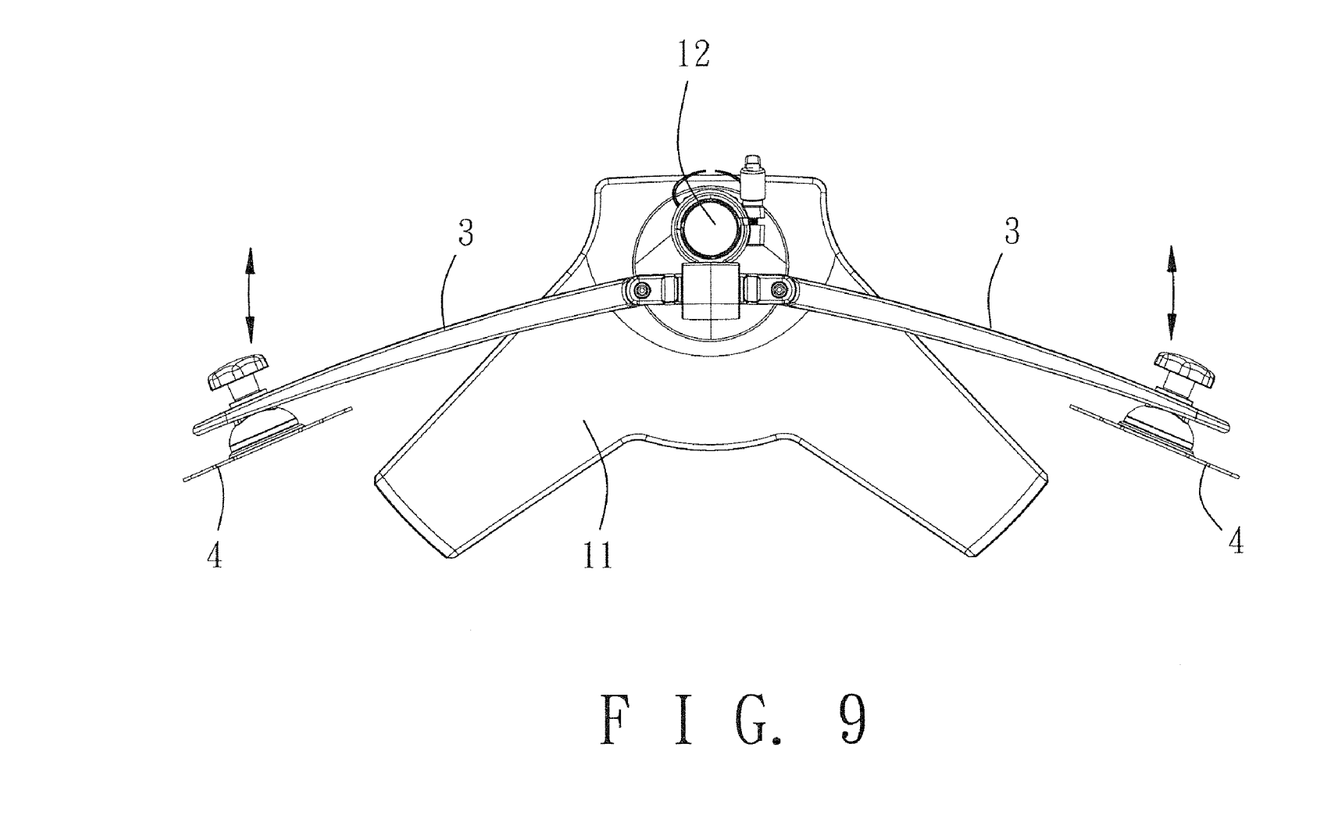

As shown in FIG. 10, the movable connectors 4 can be operated to adjust the distance between the screens or the horizontal positions of the screens. Furthermore, as shown in FIGS. 8 and 9, the side arms 3 can be pivoted relative to the sliding member 22 to adjust the distance between the user and each of the screens. Further, the sliding member 22 can be operated to move the sliding rods 222 within the slide slots 211, respectively, to adjust the inclination angle of the screens. With particular reference to FIG. 5, when the sliding rods 222 are disposed respectively at the lower ends 2112 of the slide slots 211, upper ends of the movable connectors 4 are disposed behind lower ends of the movable connectors 4. In this state, the movable connectors 4 are inclined forwardly and downwardly. With particular reference to FIG. 6, when the sliding rods 222 are disposed respectively at the upper ends 2111 of the slide slots 211, the upper ends of the movable connectors 4 are disposed in front of the lower ends of the movable connectors 4. In this state, the movable connectors 4 are inclined forwardly and upwardly. With particular reference to FIG. 7, the mounting member 21 can be moved on the supporting rod 12 to adjust the height of the two screens simultaneously.

Figure 11:
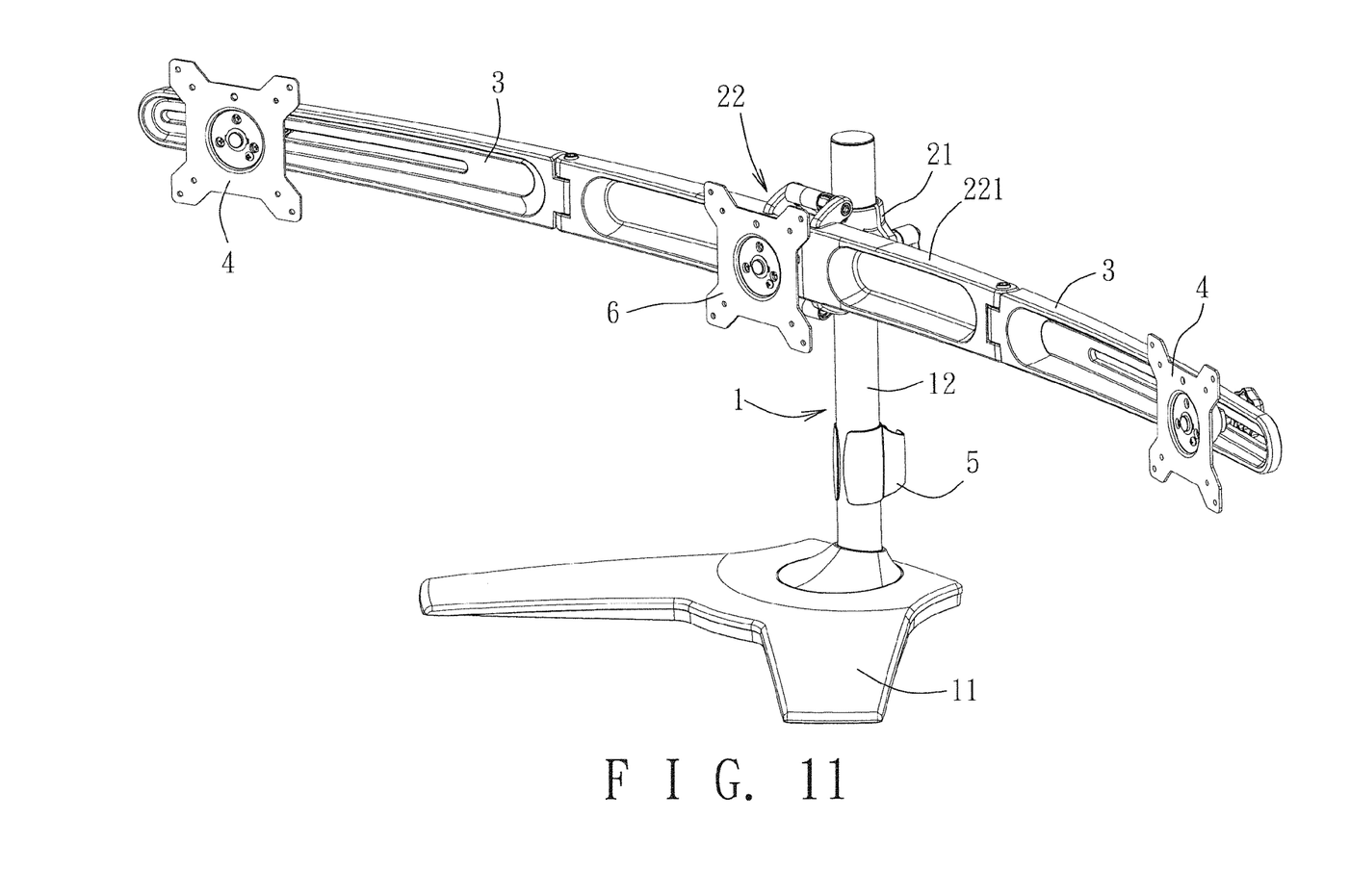
FIG. 11 is a perspective view of the second preferred embodiment of a screen supporting apparatus according to this invention.

FIG. 11 shows the second preferred embodiment of a screen supporting apparatus according to this invention, which is similar in construction to the first preferred embodiment. Unlike the first preferred embodiment, the length of the main body 221 of the sliding member 22 is increased, and a fixed connector 6 is disposed on the sliding member 22 so as to allow for co-movement with the sliding member 22, while preventing horizontal movement relative to the sliding member 22. The fixed connector 6 is adapted for mounting another screen. As such, three screens can be supported by the second preferred embodiment.

Figure 12:
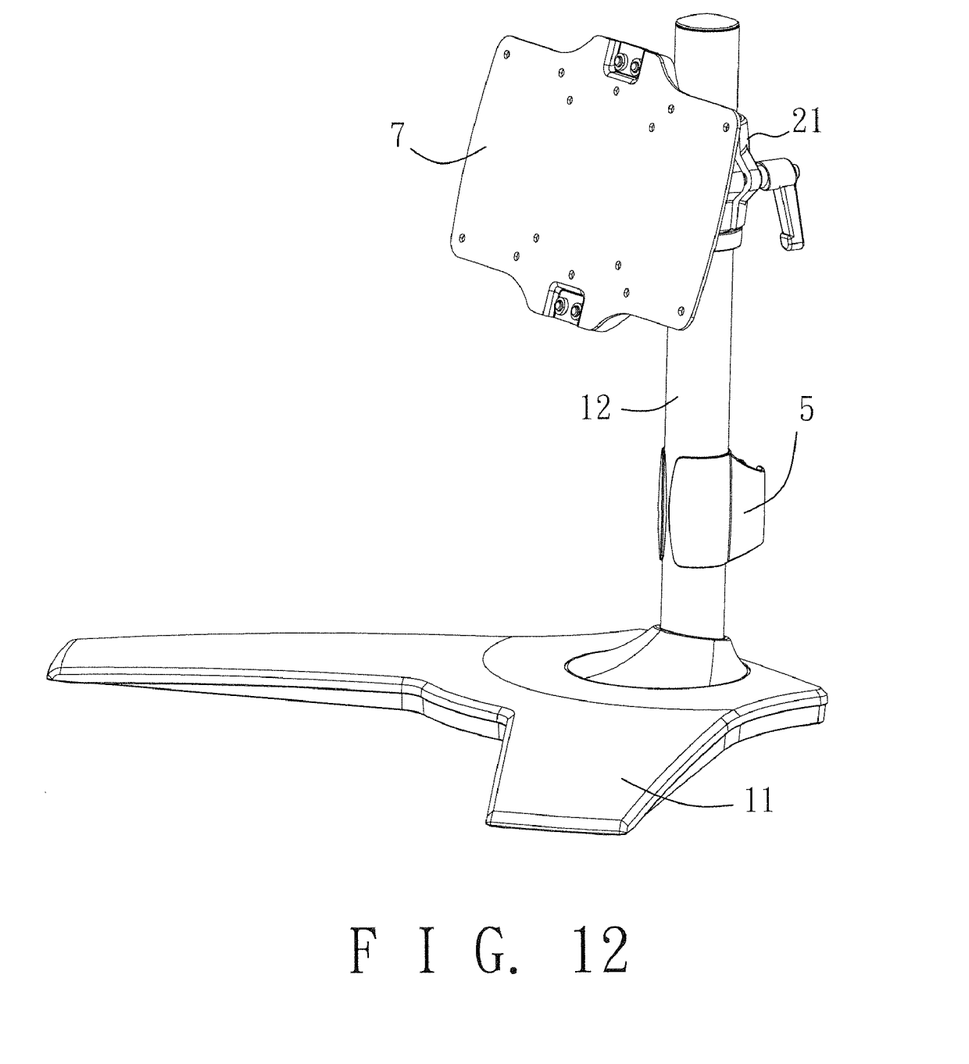
FIG. 12 is a front perspective view of the third preferred embodiment of a screen supporting apparatus according to this invention.
Figure 13:
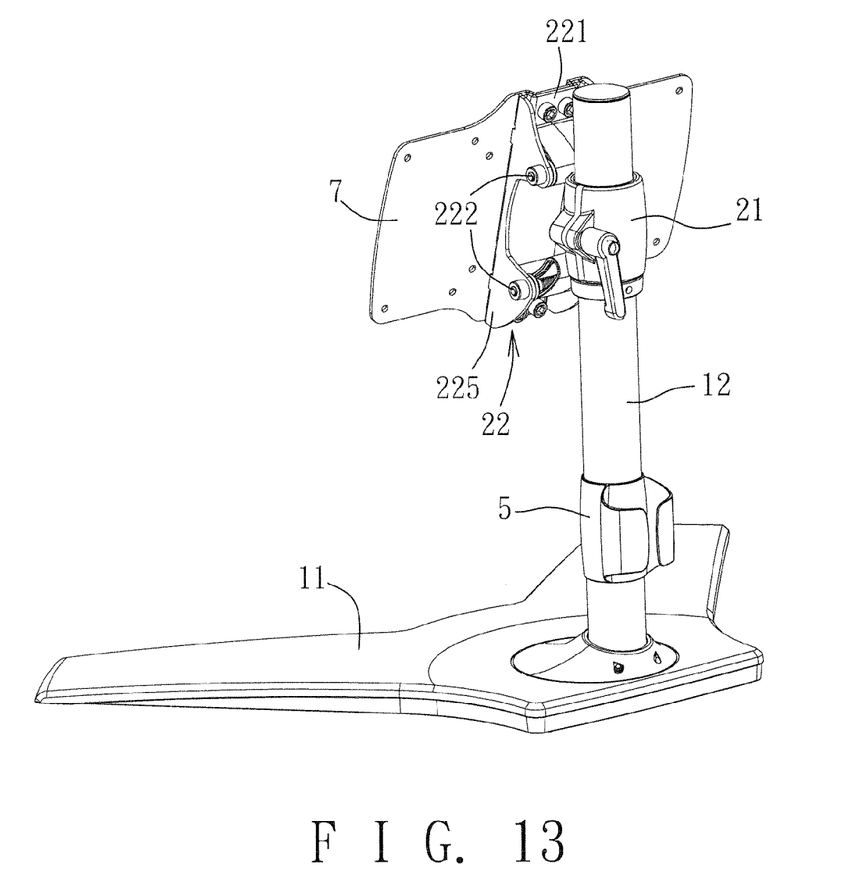
FIG. 13 is a rear perspective view of the third preferred embodiment.

FIGS. 12 and 13 show the third preferred embodiment of a screen supporting apparatus according to this invention, which is also similar in construction to the first preferred embodiment. In this embodiment, the two side arms 3 (see FIG. 1) and the movable connectors 5 (see FIG. 1) are omitted, and a connector plate 7 is added. The connector plate 7 is disposed on the sliding member 22 for mounting a screen (not shown).

In view of the above, each of the movable connectors 4, the fixed connector 6, and the connector plate 7 can be used to support a screen, such that the inclination angle of the screen can be adjusted. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A screen supporting apparatus comprising:
   a supporting member including a base and an upright supporting rod disposed fixedly on and above said base; and
   a movable assembly including
      a mounting member disposed on said supporting rod and including a slideway unit, and
      a sliding member having two spaced-apart engaging portions slidable within said slideway unit of said mounting member to adjust an inclination angle of said sliding member relative to said mounting member;
   wherein said slideway unit of said mounting member includes a pair of curved upper and lower slideways each having an upper end and a lower end disposed below said upper end said upper slideway being disposed above said lower slideway;
   wherein said upper and lower slideways are configured respectively as two slide slots formed through said mounting member;
   wherein said mounting member further includes a slot-defining portion formed with said slide slots;
   wherein said slot-defining portion includes a curved upper hollow body extending forwardly and upwardly from said sleeve portion, and a curved lower hollow body disposed under said upper hollow body and extending forwardly and downwardly from said sleeve portion, each of said upper and lower hollow bodies being configured as a sleeve, each of said slide slots being formed through a corresponding one of said upper and lower hollow bodies and extending along the length of the corresponding one of said upper and lower hollow bodies.

2. The screen supporting apparatus as claimed in claim 1, wherein said engaging portions of said sliding member are slidable respectively along said upper and lower slideways of said mounting member.

3. The screen supporting apparatus as claimed in claim 2, wherein said engaging portions of said sliding member are configured respectively as two sliding rods extending through said slide slots.

4. The screen supporting apparatus as claimed in claim 3, wherein said mounting member further includes a sleeve portion sleeved movably on said supporting rod, and a first locking element for locking said sleeve portion releaseably on said supporting rod, said slot-defining portion being connected fixedly to said sleeve portion.

5. The screen supporting apparatus as claimed in claim 4, further comprising:
two side arms extending from two opposite side of said sliding member away from each other; and
two movable connectors disposed respectively and movably on said side arms, each of said movable connectors being movable along a longitudinal direction of a respective one of said side arms and adapted for mounting a screen thereon and in front thereof;
wherein, when said engaging portions of said sliding member are disposed respectively at said lower ends of said upper and lower slideways, upper ends of said movable connectors are disposed behind said lower ends of said movable connectors, and when said engaging portions of said sliding member are disposed respectively at said upper ends of said upper and lower slideways, said upper ends of said movable connectors are disposed in front of said lower ends of said movable connectors.

6. The screen supporting apparatus as claimed in claim 5, wherein said sliding member further has a main body, said main body having an upper side, a lower side, and two lateral sides opposite to each other in a left-to-right direction, said sliding rods extending respectively along said upper and lower sides, said two side arms being connected respectively and pivotally to said lateral sides.

7. The screen supporting apparatus as claimed in claim 5, wherein said sliding rods are locked respectively and releaseably on said upper and lower hollow bodies.

8. The screen supporting apparatus as claimed in claim 5, wherein:
each of said side arms includes an arm body, a guide slot formed in said arm body and extending along a longitudinal direction of said arm body, a pivot shaft connected fixedly to an end of said arm body and connected pivotally to said sliding member, and a position-limiting rib extending from said pivot shaft toward said sliding member; and
said sliding member further has two position-limiting grooves, said position-limiting ribs of said side arms being rotatable respectively within said position-limiting grooves for limiting a rotational angle range of said side arms relative to said sliding member.

9. The screen supporting apparatus as claimed in claim 5, wherein each of said movable connecters includes a supporting plate adapted for mounting the screen, an insert element connected fixedly to said supporting plate and formed with a sliding block movable within said guide slot in a corresponding one of said side arms, and a second locking element for locking a corresponding one of said movable connectors releaseably on the corresponding one of said side arms.

10. The screen supporting apparatus as claimed in claim 4, wherein each of said sliding rods includes a bolt extending through a corresponding one of said slide slots, and two stepped washers sleeved on said bolt and extending respectively and partially into the corresponding one of said slide slots.

11. A screen supporting apparatus comprising:
a supporting member including a base and an upright supporting rod disposed fixedly on and above said base; and
a movable assembly including
a mounting member disposed on said supporting rod and comprising
a sleeve portion sleeved movably on said supporting rod; and
a first locking element for locking said sleeve portion releasably on said supporting rod;
said mounting member including a slideway unit, said slideway unit comprising:
a slot defining portion connected fixedly to said sleeve portion and formed with a pair of curved upper and lower slideways configured as two slide slots formed through said mounting member, each slideway having an upper end and a lower end disposed below said upper end, said upper slideway being disposed above said lower slideway;
a sliding member comprising:
two spaced-apart engaging portions slidable within said slideway unit of said mounting member to adjust an inclination angle of said sliding member relative to said mounting member, said engaging portions configured as two sliding rods extending through said slide slots slidable respectively along said upper and lower slideways of said mounting member;
two side arms extending from two opposite sides of said sliding member and extending away from each other wherein each of said side arms includes:
an arm body;
a guide slot formed in said arm body and extending along a longitudinal direction of said arm body;
a pivot shaft connected fixedly to an end of said arm body and connected pivotally to said sliding arm member; and
a position-limiting rib extending from said pivot shaft toward said sliding member;
two position-limiting grooves, said position-limiting ribs of said side arms being rotatable respectively within said position-limiting grooves for limiting a rotational angle range of said side arms relative to said sliding member; and
two movable connectors disposed respectively and movably on said side arms, each being movable along a longitudinal direction of a respective one of said side arms and adapted for mounting a screen thereon and in front thereof,
wherein, when said engaging portions of said sliding member are disposed respectively at said lower ends of said upper and lower slideways, upper ends of said movable connectors are disposed behind said lower ends of said movable connectors, and when said engaging portions of said sliding member are disposed respectively at said upper ends of said upper and lower slideways, said upper ends of said movable connectors are disposed in front of said lower ends of said movable connectors.

12. The screen supporting apparatus as claimed in claim 11, further comprising a fixed connector disposed fixedly on said sliding member and adapted for mounting another screen.

13. The screen supporting apparatus as claimed in claim 11, further comprising a connector plate disposed on said sliding member and adapted for mounting a screen.

14. A screen supporting apparatus comprising:
a supporting member including a base and an upright supporting rod disposed fixedly on and above said base; and
a movable assembly including
a mounting member disposed on said supporting rod and comprising:
a sleeve portion sleeved movably on said supporting rod; and
a first locking element for locking said sleeve portion releasably on said supporting rod;
said mounting member including a slideway unit, said slideway unit comprising:
a slot defining portion connected fixedly to said sleeve portion and formed with a pair of curved upper and lower slideways configured as two slide slots formed through said mounting member, each slideway having an upper end and a lower end disposed below said upper end, said upper slideway being disposed above said lower slideway;
a sliding member comprising:
two spaced-apart engaging portions slidable within said slideway unit of said mounting member to adjust an inclination angle of said sliding member relative to said mounting member, said engaging portions configured as two sliding rods extending through said slide slots slidable respectively along said upper and lower slideways of said mounting member;
two side arms extending from two opposite sides of said sliding member and extending away from each other; and
two movable connectors disposed respectively and movably on said side arms, each being movable along a longitudinal direction of a respective one of said side arms and adapted for mounting a screen thereon and in front thereof, said movable connectors includes:
a supporting plate adapted for mounting the screen;
an insert element connected fixedly to said supporting plate and formed with a sliding block movable within said guide slot in a corresponding one of said side arms; and
a second locking element for locking a corresponding one of said movable connectors releasably on the corresponding one of said side arms;
wherein, when said engaging portions of said sliding member are disposed respectively at said lower ends of said upper and lower slideways, upper ends of said movable connectors are disposed behind said lower ends of said movable connectors, and when said engaging portions of said sliding member are disposed respectively at said upper ends of said upper and lower slideways, said upper ends of said movable connectors are disposed in front of said lower ends of said movable connectors.

15. The screen supporting apparatus as claimed in claim 14, further comprising a fixed connector disposed fixedly on said sliding member and adapted for mounting another screen.

16. The screen supporting apparatus as claimed in claim 14, further comprising a connector plate disposed on said sliding member and adapted for mounting a screen.

* * * * *